United States Patent [19]

Nakano et al.

[11] 4,313,660

[45] Feb. 2, 1982

[54] RELEASE DEVICE FOR A CAMERA

[75] Inventors: Yoshiyuki Nakano, Tokyo; Akihiko Sato, Kawasaki; Masakazu Tomatsuri, Tokyo, all of Japan

[73] Assignee: Nippon Kogaku K.K., Tokyo, Japan

[21] Appl. No.: 214,046

[22] Filed: Dec. 8, 1980

[30] Foreign Application Priority Data

Feb. 5, 1980 [JP] Japan ............................. 55-12445[U]

[51] Int. Cl.³ .......................... G03B 9/08; G03B 17/38
[52] U.S. Cl. ..................................... 354/234; 354/266
[58] Field of Search ................. 354/234, 266, 267, 268

[56] References Cited

U.S. PATENT DOCUMENTS

| | | | |
|---|---|---|---|
| 3,713,373 | 1/1973 | Sato | 354/267 |
| 4,118,724 | 10/1978 | Ueda et al. | 354/266 |
| 4,133,608 | 1/1979 | Tanaka | 354/266 |
| 4,134,658 | 1/1979 | Suzuki et al. | 354/266 |
| 4,178,086 | 12/1979 | Date et al. | 354/267 |
| 4,208,110 | 6/1980 | Ito et al. | 354/267 |
| 4,212,525 | 7/1980 | Urano et al. | 354/266 |

*Primary Examiner*—Russell E. Adams
*Attorney, Agent, or Firm*—Fitzpatrick, Cella, Harper & Scinto

[57] ABSTRACT

In a camera having a shutter device which is capable of controlling the movement of a forward shutter curtain and/or a rearward shutter curtain by electromagnetic means operatively associated with the depression of a shutter button and which is capable of controlling the movement of the two shutter curtains by mechanical means instead of the electromagnetic means, there is provided a shutter release member for operating the mechanical means. The shutter release member has an operating portion provided on the outer surface of the camera separately from the shutter button.

4 Claims, 6 Drawing Figures

4,313,660

RELEASE DEVICE FOR A CAMERA

BACKGROUND OF THE INVENTION

1. Field of the Invention

This invention relates to a release device for a camera, which device controls the movement of shutter curtains by electromagnetic means, such as an electromagnetic release device, an electric shutter device, or the like.

2. Description of the Prior Art

When the power supply battery is consumed, a device of the type described cannot effect photography or, if it can, the photography is not satisfactory. Thus, heretofore, there have been cameras in which, usually, by depressing the shutter button, the aforementioned electromagnetic release device or electric shutter device are operated to control the movement of the shutter curtains, and when the power supply battery has been consumed, the shutter button is depressed to operate mechanical means without operating the aforementioned electromagnetic means, to thereby control the movement of the shutter curtains.

In such cameras, however, the shutter curtains is moved by operating the same shutter button both when the shutter curtains are moved by the electromagnetic means (electromagnetic control) and when the shutter curtains are moved by the mechanical means (mechanical control) and therefore, it is difficult for the photographer to recognize by which means the shutter curtains are being moved and accordingly, there exists the disadvantage that the photographer forgets which of the electromagnetic control or the mechanical control is being effected and the photographer continues photographing while fancying that automatic exposure is operating, thus causing an improper exposure to occur.

SUMMARY OF THE INVENTION

It is an object of the present invention to eliminate the above-noted disadvantage and to provide a release device for a camera in which the movement of the shutter curtains can be controlled by either electromagnetic means or mechanical means and which enables the photographer readily to recognize by which means the shutter curtains are being moved.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 2:
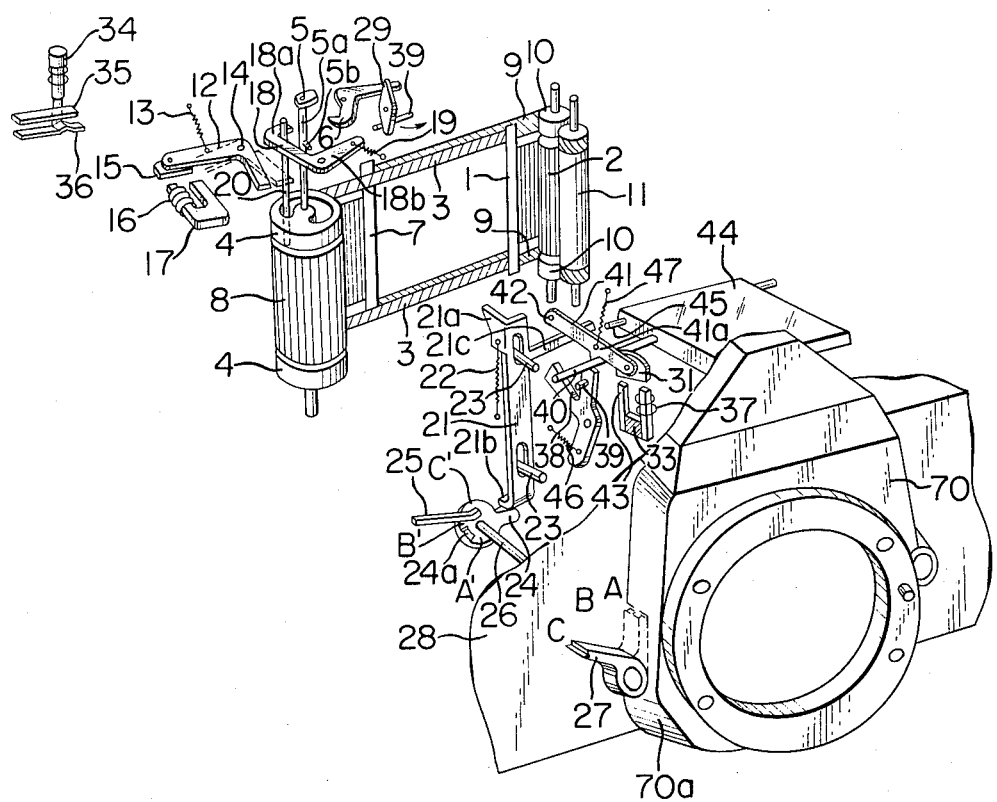
Figure 3:
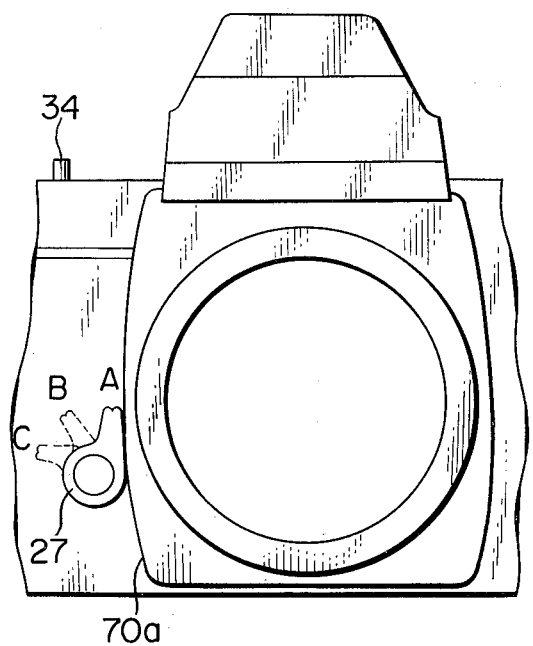

The invention will hereinafter be described with respect to embodiments thereof shown in the drawings. A first embodiment shown in FIGS. 1–3 has an electromagnetic release device and an electric shutter device. Reference numeral 1 designates a forward shutter curtain, reference numeral 2 denotes a forward shutter curtain take-up drum (containing therein a conventional drive spring), reference numeral 3 designates a forward shutter curtain cord, reference numeral 4 denotes a forward shutter curtain pulley, reference numeral 5 designates a forward shutter curtain start hook integral with the forward shutter curtain pulley 4 through the shaft 5a, and reference numeral 6 denotes a forward shutter curtain pawl member whose fore end pawl can catch the forward shutter curtain start hook 5. When a mirror driving lever pin 39 is moved in the direction of the arrow, an intermediate lever 29 is pivotally moved as shown in FIG. 2. By the pivotal movement of the intermediate lever 29, the forward shutter curtain pawl member 6 is also pivotally moved as shown in FIG. 2 and as a result, the restraint of the forward shutter curtain start hook 5 is released.

Reference numeral 7 designates a rearward shutter curtain, reference numeral 8 denotes a rearward shutter curtain drum, reference numeral 9 designates a rearward shutter curtain cord, reference numeral 10 denotes a rearward shutter curtain pulley, and reference numeral 11 designates a rearward shutter curtain take-up drum on which the rearward curtain cord is wound. A first rearward shutter curtain pawl 12 is biased clockwise by a spring 13 having one end attached to the pawl 12 between a pivot shaft 14 and one end 12a of the pawl and the other end fixed to a stationary element. An armature 15, cooperating with an electromagnet comprising a coil 16 and a yoke 17, is provided on the end 12a of the first rearward shutter curtain pawl 12. When the power supply from an unshown circuit to the coil 16 is cut off, the armature 15 is separated from the yoke 17 and as a result, the rearward shutter curtain pawl 12 is rotated clockwise about the shaft 14 by the bias force of the spring 13. By this, the first rearward shutter curtain pawl 12 is retracted out of the locus of rotation of a rearward shutter curtain pin 20 so as to release the restraint of the rearward shutter curtain pin 20, as shown in FIG. 2.

In the present embodiment, the members 12, 13, 15, 16 and 17 together constitute the time adjusting device of the electric shutter. A second rearward shutter curtain pawl 18 is biased by a spring 19 so that the side 18b thereof is normally urged against the inclined surface portion 21a of a slide lever 21. When the slide lever 21 moves upwardly, the inclined surface portion 21a of the lever 21 acts to release its engagement with the second rearward shutter curtain pawl 18, but the second rearward shutter curtai pawl 18 is turned rightwardly about a pivot shaft 180 by the spring 19 so as to bear against the inclined surface portion 21a and as a result, the fore end 18a of the second rearward shutter curtain pawl 18 restrains the rearward shutter curtain pin 20 to stop the advance of the rearward shutter curtain 7. A spring 22 is set to a spring force sufficiently stronger than the spring 19 and therefore, when the slide lever 21 is in its lower position, the tip end 18a of the second rearward shutter curtain pawl 18 is retracted out of the locus of rotation of the rearward shutter curtain pin 20 and thus, it does not restrain the rearward shutter curtain pin 20. Another extraneously operable shutter lever 27 different from a shutter button 34 is provided along the side wall 70a of a cover 70 (hereinafter referred to as the apron) which usually covers the lens mounting portion at the front of the body. This lever 27 is a mechanical shutter lever and usually assumes a position A along the side wall 70a and, when it is drawn out by causing a pawl to engage the knurled portion of the upper end of the lever, it assumes a position B.

Figure 5:
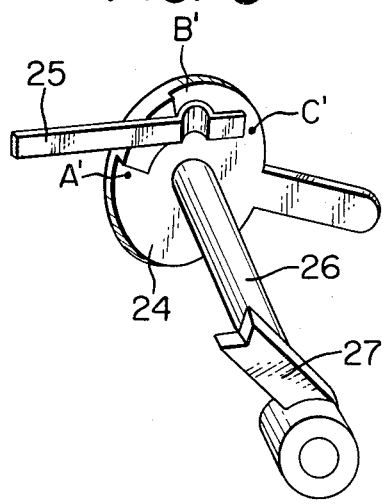
FIG. 5 is an enlarged view of a mechanical shutter lever and a cam.

As shown enlarged in FIG. 5, a cam plate 24 integral with the lever 27 through an arm 26 is provided with a projected portion 24a, and a click spring 25 bears against the surface of the cam plate 24 and it assumes a position A′ corresponding to the position A of the lever 27 and assumes a position B′ corresponding to the position B of the lever 27. Between the positions B′ and C′, the click spring 25 is free with respect to the cam plate 2. When the mechanical shutter lever 27 is rotated to the positions B→C, the cam plate 24 is also rotated to the positions B′→C′ and raises the slide lever 21 upwardly along a guide pin 23. As a result, the rearward shutter curtain pawl 18 is rotated clockwise by the spring 19 so that the end portion 18a thereof comes into the locus of rotation of the rearward shutter curtain pin 20. That is, design is made such that the rearward shutter curtain pin 20 is restrained by the members 27-24-21-18-20. The shaft 5a of the forward shutter curtain start hook 5 is designed so as to be rotated at a predetermined speed of rotation by an unshown mechanism, and a forward shutter curtain interlocking pin 5b is provided on that shaft. This pin 5b is for pressing the side wall of the lever 18 which is restraining the rearward shutter curtain pin 20 and for retracting the end portion 18a of the lever 18 out of the locus of rotation of the pin 20. That is, the rotation of the forward shutter curtain interlocking pin 5b effects the release of the rearward shutter curtain pawl 18.

A lever 41 is biased counter-clockwise by a spring 47, and a swingable armature 31 provided pivotably on the fore end of the lever 41 is attracted to a combination magnet 33, 37, 43. The lever 41 is rotatable about a pivot 42 and a hook 41a provided thereon is for restraining a mirror driving lever 38. The mirror driving lever 38 is biased clockwise by a spring 46 and is designed to drive a mirror pin 40. A mirror driving lever pin 39 provided on this lever 38 is for driving the aforementioned intermediate lever 29. The mirror pin 40 is for rotatively driving a mirror 44 about a rotary shaft 45.

In the present embodiment, the combination magnet 33, 37, 43, the lever 41, the spring 47 and the armature 31 together constitute an electromagnetic release driving device.

Description will now be made of the operation of normal photography in a case where the power supply battery is sufficient. When the shutter button 34 of the camera is depressed from the position of FIG. 1, a switch comprising contact pieces 35 and 36 is closed, as indicated by broken line in FIG. 2, so that a current flows to a coil 37 by way of an unshown conventional circuit, and a magnetic field opposite to that of a permanent magnet 33 is created in the combination magnet 33, 37, 43. With the film advance having been completed in the camera, the armature 31 is brought into contact with the combination magnet 33, 34, 43 by an unshown charge mechanism and is attracted by the action of the permanent magnet 33, but when a current flows to the coil 37, as described above, and an opposite magnetic field is created in the combination magnetic 33, 37, 43, the armature 31 is released from the attraction and the lever 41 is rotated counter-clockwise about the pivot 42 by the bias force of a spring 47. The hook 41a is retracted from the end of the lever 38 and the mirror driving lever 38 is rotated clockwise by the bias force of a spring 46 (see FIG. 2).

The mirror 44 starts to move upwardly from the observation position to the photographing position through the mirror pin 40 (see FIG. 2). As is well-known, during the upward movement of the mirror 44, the coil 16 is supplied with power with a predetermined time delay with respect to the power supply to the coil 37 and the electromagnet 16, 17 attracts and holds the armature 15. In the well-known construction, the power supply to the coil 16 is started by an unshown switch adapted to be closed when the lever 38 starts to move. The rearward shutter curtain pawl 12 is urged so that the armature 15 is brought into contact with the yoke 17 by unshown mechanical means operatively associated with the film advance operation of the camera, and this mechanical urging is released by an unshown mechanism simultaneously with the movement of the forward shutter curtain. By this, the release of the rearward shutter curtain becomes possible. Accordingly, during the upward movement of the mirror, that is, during the time before the forward shutter curtain moves, the armature 15 is in contact with the yoke 17 and can be readily attracted to the yoke 17. When the armature 15 is so attracted, the end of the lever 12 comes to lie within the locus of rotation of the rearward shutter curtain pin 20 to prevent the movement of the rearward shutter curtain 7 (indicated by broken lines in FIG. 2). As soon as the mirror 44 completes its upward movement, the pin 49 rotates the intermediate lever 29 counter-clockwise, whereby the forward shutter curtain pawl member 6 is rotated clockwise (see FIG. 2). As a result, the restraint of the forward shutter curtain start hook 5 is released and the forward shutter curtain 1 moves to the right (see FIG. 2). Thereafter, when a time determined by an unshown exposure control circuit elapses, the power supply to the coil 16 is cut off. By this time, the mechanical urging of the rearward shutter curtain pawl 12 has already been released with the movement of the forward shutter curtain 1, as already described and therefore, when the power supply to the coil 16 is cut off, the electromagnet 16, 17 is deenergized and the rearward shutter curtain pawl 12 is rotated clockwise by the force of the spring 13. Consequently, the end portion of the rearward shutter curtain 12 is retracted out of the locus of rotation of the rearward shutter curtain pin 20, so that the rearward shutter curtain pin 20 is rotated clockwise and movement of the rearward shutter curtain 7 is effected. In the case of the above-described operation, the rearward shutter curtain pawl 18 keeps its position of FIG. 1 and does not prevent the movement of the rearward shutter curtain pin 20. Thus, the exposure operation is completed and the mirror 44 and lever 38 are returned to their initial positions by an unshown mechanism. Thereafter, when the film advance operation is effected by a film advance lever or the like, the position of FIG. 1 is restored.

The above-described device can effect photographing at a predetermined shutter time even when the power supply battery has been consumed to such an extent that the electromagnetic release device or the electric shutter device is not operated or the exposure control for obtaining a proper exposure cannot be effected. The operation therefor will hereinafter be described. The shutter lever 27, when not used, is placed at a position A along the side wall 70a of the apron 70, as indicated by solid lines in FIG. 3. When this shutter lever 27 is rotated so that the end portion thereof assumes a position B spaced apart from the side wall 70a, the ready-to-release condition, namely, the condition shown in FIG. 1, is brought about. When the shutter lever 27 is urged from the position B to the position C, the members 26 and 24 are rotated against the bias force of the spring 22 and the slide lever 21 starts to move upwardly. The arm 21c of the slide lever pushes up the lever 41 attracted to the combination magnet 33, 37, 43 by the action of the permanent magnet 33. That is, the lever 41 is rotated about the pivot 42. Thus, the restraint of the lever 38 by the hook 41a is released and the lever 38 is rotated clockwise and as previously described, the upward movement of the mirror 44 is effected through the pin 40 and the restraint of the forward shutter curtain start hook 5 is released through the pin 39, lever 29 and pawl 6 (see FIG. 2). However, when the shutter release operation has been effected by the shutter lever 27, the rearward shutter curtain pawl 18 is rotated clockwise by upward movement of the slide lever 21 and the end portion 18a thereof comes into the locus of rotation of the rearward shutter curtain pin 20 to prevent movement of the rearward shutter curtain (see FIG. 2). This will be described in detail.

The end portion 18b of the rearward shutter curtain pawl 18 always bears against the inclined surface 21a of the slide lever with the aid of the bias force of the spring 19 and therefore, when the slide lever 21 moves upwardly, the rearward shutter curtain pawl 18 is rotated clockwise in accordance with the upward movement of the inclined surface 21a and comes to restrain the rearward shutter curtain pin 20. The relation between the inclined surface 21a and the end portion 18b and the relation between the arm 21c and the lever 41 are determined so that such restraint of the rearward shutter curtain pin 20 by the rearward shutter curtain pawl 18 is accomplished before the restraint of the forward shutter curtain start hook 5 by the forward shutter curtain pawl member 6 is released. As soon as the restraint of the forward shutter curtain start hook 5 is released to permit the forward shutter curtain 1 to start after the rearward shutter curtain pin 20 has been restrained, the urging of mechanical means which has so far mechanically urged the rearward shutter curtain pawl 12 against the electromagnet 16, 17 by an unshown mechanism is released and the electromagnet 16, 17 does not operate, and therefore, the rearward shutter curtain pawl 12 is pivoted clockwise by the spring 13 and the end portion thereof is retracted out of the locus of rotation of the rearward shutter curtain pin 20 (indicated by solid lines in FIG. 2). By the release of the restraint of the forward shutter curtain start hook 5, the shaft 5a is rotated at a predetermined rotational speed, and as the rotation thereof progresses, the pin 5b urges the side surface of the rearward shutter curtain pawl 18 to rotate the rearward shutter curtain pawl 18 counterclockwise from the position of FIG. 2 against the force of the spring 19. Accordingly, the end portion 18a is retracted out of the locus of rotation of the rearward shutter curtain pin 20, so that the restraint of the rearward shutter curtain 7 is released and the rearward shutter curtain 7 moves. The shaft 5a is rotated at a predetermined speed and therefore, when the shutter release is effected by the shutter lever 27, the time from the start of the movement of the forward shutter curtain 1 till the start of the movement of the rearward shutter curtain 7 is always constant (say, 1/90 second). When the urging of the shutter lever 27 is released, the shutter lever 27 is returned from the position C to the position B by the action of the spring 22.

Figure 1:
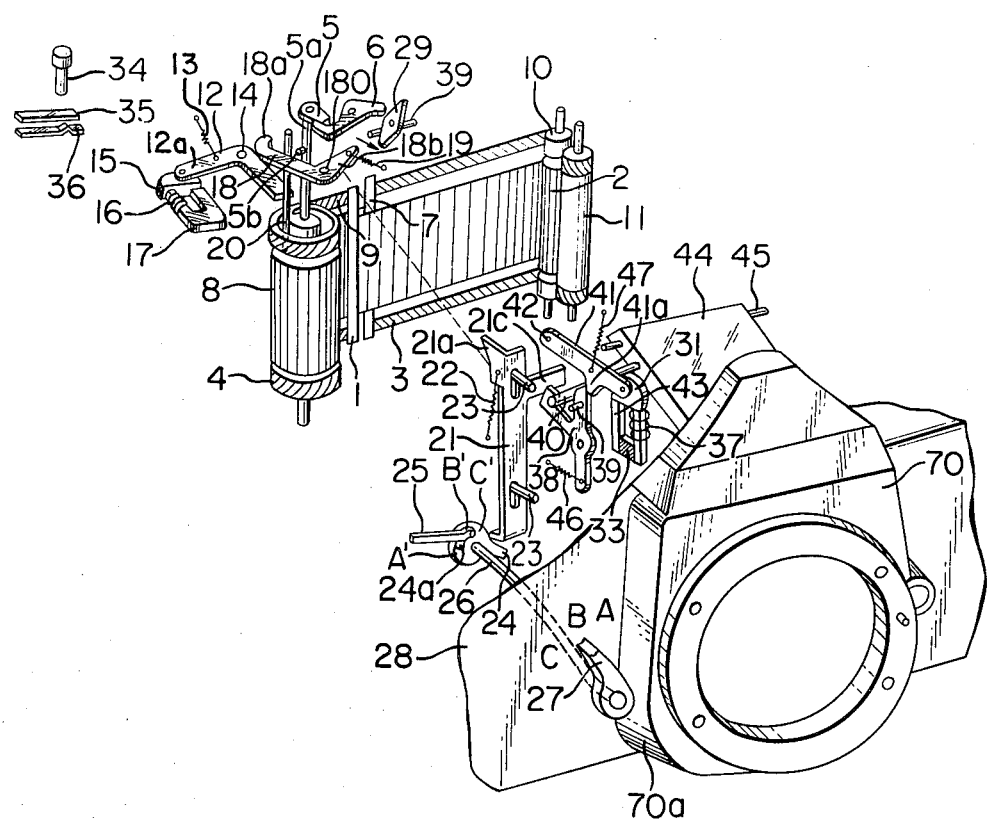
FIGS. 1 to 3 show a first embodiment of the present invention, FIG. 1 being a perspective view illustrating the condition after completion of film advance and before the movement of the forward shutter curtain, FIG. 2 being a perspective view illustrating the condition just prior to completion of the movement of the forward shutter curtain, and FIG. 3 being a front view illustrating the operating condition of a shutter lever 27.

Thus, the exposure operation is completed and thereafter, when the film advance operation is effected, the condition of FIG. 1 is restored.

Since the shutter lever 27 is disposed along the side wall 70a of the apron 70, the side wall 70a provides a guide wall during the operation of the lever 27, thus enabling the release operation to be effected stably.

In the present embodiment, the restraint of the mirror driving lever 38 is released by the electromagnetic release device 33, 37, 43 and the release of the restraint of the forward shutter curtain is effected in response to a series of operations caused by the release of said restraint. Alternatively, however, other members such as the diaphragm driving member and the like may be operated by the electromagnetic release device and the release of the restraint of the forward shutter curtain may be effected in response to a series of operations occurring in subsequence to said operation. Of course, the release of the restraint of the forward shutter curtain may be directly effected by the electromagnetic release device.

In the above-described embodiment, when the shutter is released by the shutter lever 27, the lever 41 must be moved upwardly against the attraction of the permanent magnet 33 to release the engagement between the hook 41a and the shutter button 34. Accordingly, a great pressure force is required during the shutter release. A second embodiment described below overcomes this characteristic.

Figure 4:
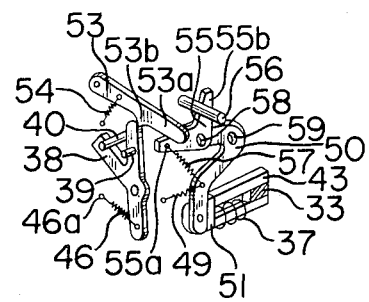
FIG. 4 shows a second embodiment of the present invention and is a perspective view of the mechanism in the neighborhood of the electromagnetic release device.

In FIG. 4, members 38, 39, 46, 40, 33, 37 and 43 are constructed similarly to the first embodiment and need not be described. A lever 50 is pivotably supported on a shaft 59 and has an armature 51 provided at one end thereof. A spring 49 biases the lever 50 clockwise. A lever 55 is pivotally supported on the other end of the lever 50, and a spring 57 is extended between the levers 50 and 55. Designated by 56 is a limit pin fixed to the camera body. A lever 53 is biased clockwise by a spring 54 and the end 53a thereof extends on the end 55a of the lever 55. A hook 53b is engaged with the end of the lever 38. The other elements are similar to those of the first embodiment.

The operation of the present embodiment will hereinafter be described. Description will first be made of a case in which the power supply battery is sufficient.

When the shutter button 34 is depressed, the combination magnet 33, 37, 43 releases the attraction of the armature 51 through switches 35 and 36. The lever 50 is rotated clockwise by the force of the spring 49. The end 55b of the lever 55 is brought into contact with the limit pin 56 by a spring 57 and therefore, when the lever 50 starts to rotate clockwise, the lever 55 also rotates clockwise about a pivot 58 on the lever 50 while being limited by the force of the spring 57 and the limit pin 56, whereby the end 55a pushes up the end 53a of the lever 53 from therebelow. Accordingly, the lever 53 is rotated counter-clockwise against the force of the spring 54 and a hook 53b releases the restraint of the lever 38. The lever 38 is rotated clockwise by the force of a spring 46, thus effecting upward movement of the mirror and the release of the restrait of the forward shutter curtain as in the first embodiment.

As the clockwise rotation of the lever 50 further progresses after the hook 53b has been disengaged from the end portion of the lever 38, the end 55a of the lever 55 is disengaged from the end portion of the lever 53 because the end 55b bears against the limit pin 56 and thus, the end 55a is retracted out of the locus of pivotal movement of the lever 53 and the lever 53 is rotated clockwise to its initial position by the spring 54 (the condition of FIG. 4). As the rotation of the lever 50 further progresses, that portion of the lever 50 which is adjacent to the pin 56 bears against this pin 56, so that the rotation of the lever 50 is stopped. At this time, the end 55b of the lever 55 is also still in contact with the limit pin 56 and the end 55a of this lever 55 is positioned at the right of the lever 53 shown in FIG. 4. This point of time is still before the movement of the forward shutter curtain.

When the upward movement of the mirror 44 and the movement of the forward shutter curtain 1 and rearward shutter curtain 7 are completed, the mirror 44 is returned from its upwardly moved position by an unshown mechanism and the lever 38 is also returned to its position of FIG. 4 by an unshown mechanism. By this time, the lever 53 has already returned to its shown position and therefore, the end portion of the lever 38 bears against the hook 53b in the course of its return to pivot the lever 53 counterclockwise, thus riding across the hook 53b. Thereafter, when a film advance operation is effected by the film advance lever or the like, the end 46a of the spring 46 is pulled by a mirror charge member, not shown, and as shown in FIG. 4, the engagement between the hook 53b and the lever 38 is accomplished and a bias force is accumulated in the spring 46. At the same time, the lever 50 is rotated counter-clockwise against the force of the spring 49 by a charge member, not shown. As the film advance operation progresses, the end 55a of the lever 55 comes to bear against the right side of the lever end 53a which has already returned to its position of FIG. 4 and, when the rotation of the lever 50 further progresses and the shaft 58 is displaced counter-clockwise, the lever 55 is rotated clockwise on the lever 50 and the end 55b becomes spaced apart from the limit pin 56. As the rotation of the lever 50 progresses, the end 55a of the lever 55 becomes disengaged from the right side of the lever 53 and is momentarily rotated clockwise about the shaft 58 on the lever 50 by a spring 57. Thus, the end 55b again bears against the limit pin 56 and the end 55a comes under 53a as shown in FIG. 4. When the armature 51 bears against the yoke 43, that position is held by the permanent magnet 33. The spring 49 accumulates its bias force due to the counter-clockwise rotation of the lever 50. In this manner, the film advance operation is completed and the condition of FIG. 4 is restored.

Description will now be made of the case in which the power supply battery has been consumed to the extent that the combination magnet 33, 37, 43 does not effect appropriate operation. In such case, the shutter lever 27 is operated. That is, when the shutter lever 27 is drawn out from the position A of FIG. 3 to the position B and further operated from the position B to the position C, the arm 21c rotates the lever 53 counterclockwise as viewed in FIG. 4 against the force of the spring 54 through the agency of the cam plate 24 and slide lever 21. The restraint of the lever 38 is released and the upward movement of the mirror and the movement of the forward shutter curtain is effected, and then the rearward shutter curtain pawl 18 is pushed by the forward shutter curtain interlocking pin 5b, thus effecting the movement of the rearward shutter curtain. Thereafter, the mirror 44 is moved downwardly and the lever 38 returns to its position of FIG. 4. During this time, the levers 50 and 55 are held in their positions of FIG. 4 by the permanent magnet 33 and the limit pin 56. Thereafter, when the urging of the shutter lever 27 is released, this lever 27 returns from the position C to the position B and also the lever 53 returns to its position of FIG. 4. If a film advance operation is then effected, a bias force will be accumulated in the spring 46 from the condition of FIG. 4.

According to the embodiment of FIG. 4, as described above, the operation of the shutter lever 27 is not effected against the attraction of the permanent magnet 33 and therefore, the force required to operate this shutter lever may be small. Further, in the above-described embodiment, it is not necessary to return the lever 50 to its position of FIG. 4 before the lever 53 is returned to its position of FIG. 4. That is, by constructing the levers 55 and 50 as described above, the necessity of taking into account the period between the time when the armature 51 is attracted and the time when the engagement between the hook 53 and the mirror driving lever 38 is accomplished is eliminated and this leads to simplicity of construction and adjustment. Furthermore, if the time for charging the spring 46 differs from the time for attracting the armature 51, there is a possibility that the sense of wind-up varies in the course of film advance, whereas if said two times are made coincident with each other as in the above-described embodiment, the sense of wind-up becomes uniform and this is preferable.

While the above two embodiments have been described with respect to a camera provided with an electric shutter device and an electromagnetic release device, even a camera provided with only one of these devices does not depart from the present invention.

Figure 6:
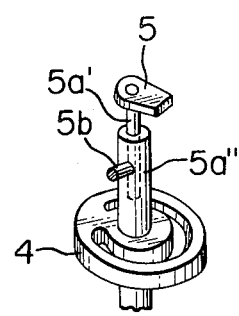
FIG. 6 is a perspective view of an example of a forward shutter curtain start hook integral with a forward shutter curtain pulley.

FIG. 6 shows another construction in which the forward shutter curtain start hook 5 is fixed to the forward shutter curtain pulley 4. This is an example in which, in fixing a shaft 5a' integral with the forward shutter curtain start hook 5 to a hollow shaft 5a'' integral with the forward shutter curtain pulley 4, the shaft 5a' is inserted into the hollow shaft 5a'' and a screw 5b for fixing the two integrally with each other from the outside of the hollow shaft 5a'' is used also as a forward shutter curtain interlocking pin.

According to the present invention, as has been described above in detail, different shutter release operating members are used in a case where the shutter curtains are moved by electromagnetic means and in a case where the shutter curtains are moved by mechanical means instead of the electromagnetic means, and this enables the photographer to readily recognize by which means the shutter curtains are being moved and enables wrong operation to be reduced.

We believe that the construction and operation of our novel release device for a camera will now be understood and that the advantages thereof will be fully appreciated by those persons skilled in the art.

We claim:

1. A camera having a shutter device capable of controlling the movement of a forward shutter curtain and/or a rearward shutter curtain by electromagnetic means operatively associated with the depression of a shutter button and which is capable of controlling the movement of said two shutter curtains by mechanical means instead of said electromagnetic means, said camera including a shutter release member for operating said mechanical means, said member having an operating portion provided on the outer surface of the camera separately from said shutter button.

2. A camera according to claim 1, wherein said shutter device first operates a member for effecting the restraint of said rearward shutter curtain by the operation of said operating portion to effect the restraint of said rearward shutter curtain, and then operates a member for restraining said forward shutter curtain to effect the release of the restraint of said rearward shutter curtain.

3. A camera according to claim 2, wherein the operating portion of said shutter release member is a rotatable type lever and is disposed along an apron side wall in the front of the camera and when said rotatable type lever is rotated away from said apron side wall, the shutter release operation becomes possible.

4. A camera according to claim 3, wherein said shutter release member is coupled to said shutter device so that when said rotatable type lever is further rotated away from said apron side wall, shutter release is effected.

* * * * *

UNITED STATES PATENT AND TRADEMARK OFFICE
CERTIFICATE OF CORRECTION

PATENT NO. : 4,313,660

DATED : February 2, 1982

INVENTOR(S) : YOSHIYUKI NAKANO, ET AL.

It is certified that error appears in the above-identified patent and that said Letters Patent are hereby corrected as shown below:

Column 1, line 18, "are" should be --is--;

line 24, "is" should be --are--.

Column 3, line 6, "curtai" should be --curtain--.

Column 4, line 14, "34" should be --37--.

Column 7, line 16, "restrait" should be --restraint--.

Signed and Sealed this

Thirteenth Day of April 1982

[SEAL]

*Attest:*

*Attesting Officer*

GERALD J. MOSSINGHOFF

*Commissioner of Patents and Trademarks*